(12) United States Patent
Lee et al.

(10) Patent No.: US 9,717,047 B2
(45) Date of Patent: Jul. 25, 2017

(54) FAIRNESS-BASED MESSAGE TRANSMISSION IN A WIRELESS NETWORK

(71) Applicant: QUALCOMM Incorporated, San Diego, CA (US)

(72) Inventors: Soo Bum Lee, San Diego, CA (US); Abhishek Pramod Patil, San Diego, CA (US); George Cherian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 166 days.

(21) Appl. No.: 14/638,815

(22) Filed: Mar. 4, 2015

(65) Prior Publication Data

US 2015/0257096 A1     Sep. 10, 2015

Related U.S. Application Data

(60) Provisional application No. 61/949,842, filed on Mar. 7, 2014.

(51) Int. Cl.
*H04B 7/00* (2006.01)
*H04W 52/02* (2009.01)
(Continued)

(52) U.S. Cl.
CPC ......... *H04W 52/0206* (2013.01); *H04L 12/18* (2013.01); *H04L 12/189* (2013.01);
(Continued)

(58) Field of Classification Search
CPC ..... H04W 40/24; H04W 48/16; H04W 48/18; H04W 52/0203
(Continued)

(56) References Cited

U.S. PATENT DOCUMENTS 6,934,612 B2 *   8/2005   Remboski .......... H04L 12/2602
                                                                370/258
7,002,949 B2 *   2/2006   Garcia-Luna-Aceves
                                        ............................... H04L 45/02
                                                                370/351
(Continued)

FOREIGN PATENT DOCUMENTS

EP              1784955 A1      5/2007

OTHER PUBLICATIONS

International Search Report and Written Opinion—PCT/US2015/019030—ISA/EPO—Aug. 25, 2015.

*Primary Examiner* — Dmitry H Levitan
(74) *Attorney, Agent, or Firm* — Toler Law Group, PC.

(57) ABSTRACT

Methods, devices, and systems are described to enable fair message transmission and to reduce maximum power consumption of stations in a wireless network. For example, a first station of the wireless network may transmit a message including a first neighbor list to a second station of the wireless network. The first neighbor list may identify one or more stations within a particular range of the first station. The second station may selectively transmit, based on a comparison between the first neighbor list and a second neighbor list and a random countdown, a copy of the message including the second neighbor list to another station of the wireless network. The second neighbor list may identify one or more stations within a particular range of the second station.

30 Claims, 7 Drawing Sheets

(51) Int. Cl.
*H04W 24/10* (2009.01)
*H04L 12/18* (2006.01)
*H04W 40/24* (2009.01)

(52) U.S. Cl.
CPC ......... *H04W 24/10* (2013.01); *H04W 40/246* (2013.01); *Y02B 60/50* (2013.01)

(58) Field of Classification Search
USPC .............................. 370/310, 315, 328, 351
See application file for complete search history.

(56) References Cited

U.S. PATENT DOCUMENTS

| | | | | |
|---|---|---|---|---|
| 7,006,453 | B1* | 2/2006 | Ahmed | H04L 45/02 370/255 |
| 7,804,807 | B2* | 9/2010 | Korus | H04L 63/20 370/315 |
| 8,745,074 | B1* | 6/2014 | Covell | G06F 17/30867 707/758 |
| 2006/0221891 | A1* | 10/2006 | Schmitz | H04L 12/189 370/328 |
| 2010/0061272 | A1 | 3/2010 | Veillette | |
| 2010/0306320 | A1 | 12/2010 | Leppanen et al. | |
| 2015/0249954 | A1* | 9/2015 | Patil | H04W 48/16 370/338 |

* cited by examiner

FAIRNESS-BASED MESSAGE TRANSMISSION IN A WIRELESS NETWORK

I. CLAIM OF PRIORITY

This application claims priority from U.S. Provisional Patent Application No. 61/949,842, filed Mar. 7, 2014 and entitled "FAIRNESS-BASED MESSAGE TRANSMISSION IN A WIRELESS MESH NETWORK," the contents of which are incorporated herein in their entirety.

II. FIELD

The present disclosure is generally related to fairness-based message transmission in a wireless network.

III. DESCRIPTION OF RELATED ART

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and Internet protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process executable instructions, including software applications, such as a web browser application, that can be used to access the Internet. As such, these wireless telephones can include significant computing capabilities.

A wireless mesh network may be formed by wireless telephones and other wireless devices to communicate data between the wireless devices without management by a central node (e.g., access point) or server. For example, Institute of Electrical and Electronics Engineers (IEEE) 802.11s is a standardized set of wireless mesh network communication protocols. In 802.11s, stations (e.g., wireless devices) in a wireless mesh network may receive messages addressed to multiple stations, such as multicast messages and broadcast messages. In order to propagate a message throughout the wireless mesh network, each station receives and transmits (e.g., forwards) the message to neighboring stations (e.g., stations within a one-hop range). Forwarding messages at each station adds traffic and overhead to the wireless mesh network. One proposed alternative includes a topology-based transmission scheme and a probabilistic forwarding scheme. However, maintaining topology awareness incurs additional overhead because a network topology is updated when a location of any station changes. Additionally, probabilistic forwarding reduces the reliability of message reception. Further, the proposed alternatives do not consider relative power consumption of each of the stations. For example, in some topologies, a particular station may be responsible for rebroadcasting a large percentage of messages, resulting in a disproportionally large power consumption at the particular station while other stations consume less power to rebroadcast a smaller percentage of messages.

IV. SUMMARY

The present disclosure improves fairness related to power consumption and reduces power consumption related to message propagation at each station in a wireless network as compared to conventional IEEE 802.11s wireless mesh networks. Instead of each station transmitting (e.g., forwarding) a received message, such as a multicast transmission or a broadcast transmission, each station determines whether to transmit the message based on an analysis of station-specific neighbor lists. For example, a source of a message (e.g., a first station) transmits the message and a first neighbor list identifying neighboring stations of the first station, such as one or more stations within a one-hop range of the first station. When the message is a multicast transmission, the neighbor list may be a multicast-specific neighbor list. The multicast-specific neighbor list of a station may include less than all neighbors of the station. When a second station receives the message and the first neighbor list, the second station compares the first neighbor list to its own neighbor list (e.g., a second neighbor list), which identifies neighboring stations of the second station (e.g., one or more stations within a one-hop range of the second station). If the second station determines that the second neighbor list identifies at least one station that is not identified by the first neighbor list (e.g., that at least one station is out-of-range of the first station but is within range of the second station), the second station transmits the message and the second neighbor list. If the second station determines that each station identified by the first neighbor list is also identified by the second neighbor list (e.g., each station within a one-hop range of the second station is also within a one-hop range of the first station), transmission of the message at the second station is suppressed. In this manner, the second station does not consume power to transmit a message when each of its neighboring stations is identified by the first neighbor list received with the message. The second station is able to conserve power because each neighboring station should receive the message from the first station, as indicated by the first neighbor list.

Fairness related to power consumption may be promoted through the use of random countdowns before message transmission. For example, the second station and a third station may receive the message and the first neighbor list from the first station. The second station and the third station may each initiate a countdown from a station-specific randomly selected countdown value in response to determining to transmit the message (e.g., based on neighbor list analysis). When the countdown is completed at the second station before the third station, the second station may transmit (e.g., forward or rebroadcast) the message and the second neighbor list (e.g., a station-specific neighbor list). For example, the second station may rebroadcast the message with the second neighbor list instead of the first neighbor list. The third station may receive the message and the second neighbor list from the second station before the countdown at the third station is completed. The third station may suppress transmission of the message based on a comparison between the second neighbor list and a third neighbor list generated by the third station. For example, the third station may stop the countdown if each station identified by the third neighbor list is also identified by the second neighbor list and if no other messages are pending transmission/forwarding. Each station may randomly select, or pseudo-randomly select, the station-specific countdown value, enabling each station to have a random (e.g., fair) chance to contribute to transmission of messages or to conserve power by suppressing transmission.

Additionally, the second station may monitor a number of messages (and neighbor lists) received from a particular station (e.g., the third station) during a particular time period. The number of messages received from the third station may indicate a level of contribution of the third station to message propagation in the wireless network and, if the number of messages is low (e.g., less than a threshold), may be a basis for removal of the third station from the wireless network. For example, the second station may determine whether to transmit a network key to the particular station based on the number of messages. By suppressing transmission of the network key, the second station may effectively remove (e.g., expel) the particular station from the wireless network (e.g., because the particular station will not be able to send encrypted messages or decrypt received messages) if the particular station does not sufficiently contribute to message propagation, as indicated by the number of messages received at the second station.

In a particular aspect, a method includes generating a first neighbor list at a first station of a wireless network. The neighbor list may identify one or more stations within a particular range of the first station. The method includes transmitting a first message including the first neighbor list to a second station of the wireless network.

In another particular aspect, an apparatus includes a processor and a memory coupled to the processor. The memory stores instructions that are executable by the processor to perform operations including generating a first neighbor list at a first station of a wireless network. The first neighbor list identifies one or more stations within a particular range of the first station. The operations further include transmitting a first message including the neighbor list to a second station of the wireless network.

In another particular aspect, an apparatus includes means for generating a first neighbor list at a first station of a wireless network. The first neighbor list identifies one or more stations within a particular range of the first station. The apparatus further includes means for transmitting a first message including the first neighbor list to a second station of the wireless network.

In another particular aspect, a non-transitory computer readable medium includes instructions that, when executed by a processor, cause the processor to generate a neighbor list at a first station of a wireless network. The neighbor list identifies one or more stations within a particular range of the first station. The instructions further cause the processor to transmit a message including the neighbor list to a second station of the wireless network.

One advantage provided by at least one of the disclosed implementations is a reduction in power consumption related to message propagation of stations of a wireless network as compared to wireless mesh networks that operate in accordance with the IEEE 802.11s standard. For example, selective transmission (e.g., forwarding) of a received message based on neighbor list analysis may enable the stations to suppress transmission of the message (e.g., when neighboring stations have already received the message), thus reducing power consumption at one or more stations, as compared to each station forwarding the particular message in wireless mesh networks. Additionally, fairness related to power consumption may be promoted through the use of countdowns from random values or pseudo-random values selected at each of the stations, thereby enabling each station to have a "fair" chance to conserve power or contribute to message propagation. Other aspects, advantages, and features of the present disclosure will become apparent after review of the entire application, including the following sections: Brief Description of the Drawings, Detailed Description, and the Claims.

V. BRIEF DESCRIPTION OF THE DRAWINGS

VI. DETAILED DESCRIPTION

Particular aspects of the present disclosure are described below with reference to the drawings. In the description, common features are designated by common reference numbers throughout the drawings.

Figure 1:
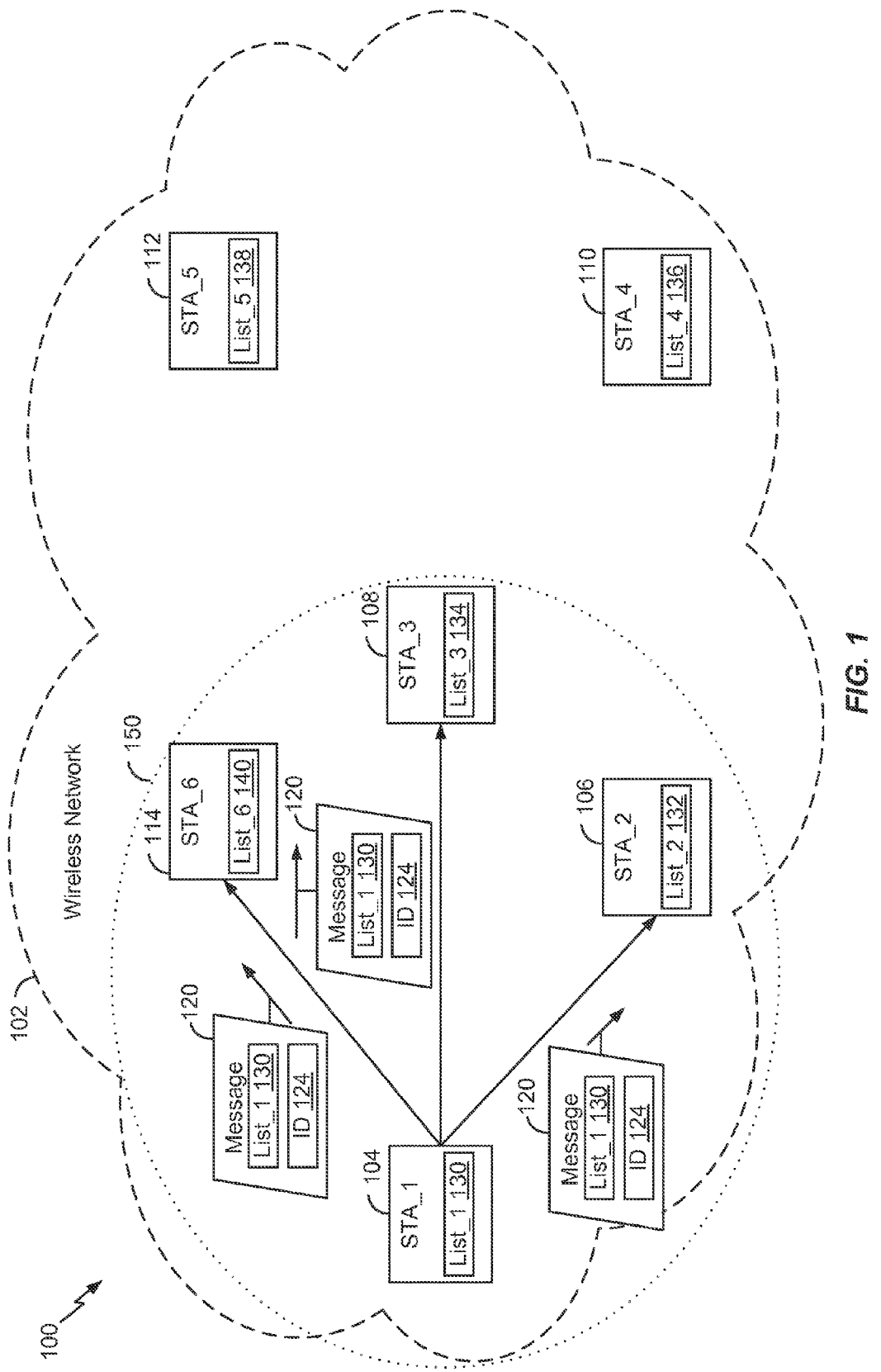
FIG. 1 is a diagram of a particular aspect of a system that includes a wireless network that supports selective transmission of messages and station-specific neighbor lists.

Referring to FIG. 1, a particular illustrative aspect of a system 100 that includes a wireless network that supports selective transmission of messages and station-specific neighbor lists is shown. The system 100 includes a wireless network 102 including a first station (STA_1) 104, a second station (STA_2) 106, a third station (STA_3) 108, a fourth station (STA_4) 110, a fifth station (STA_5) 112, and a sixth station (STA_6) 114.

The stations 104-114 may form a group of stations configured to perform wireless communications among the stations. For example, the group of stations (e.g., the stations 104-114) may be configured to perform wireless communications via one or more wireless channels. The group of stations may form a peer-to-peer wireless network. In some implementations, the group of stations may include or correspond to a data path group (e.g., a group of stations that share a particular service). In other implementations, the group of stations may include or correspond to a different infrastructure-less, ad-hoc wireless network. In a particular implementation, the wireless network 102 may be a social wireless mesh network (a "social wi-fi mesh"). In another particular implementation, the wireless network 102 may operate in accordance with one or more standards, such as an Institute of Electrical and Electronics Engineers (IEEE) 802.11 standard. As used herein, the wireless network 102 may support transmissions according to the IEEE 802.11s standard, as an illustrative, non-limiting example. Additionally, in some implementations, one or more stations of the group of stations may be part of or included in other networks. For example, one or more of the stations 104-114 may correspond to or may be included in a neighbor aware network (NAN).

Each of the stations 104-114 may be a wireless communication device configured to transmit data and/or receive data from other wireless communication devices in the wireless network 102. For example, the stations 104-114 may include a processor (e.g., a central processing unit (CPU), a digital signal processor (DSP), a network processing unit (NPU), etc.), a memory (e.g., a random access memory (RAM), a read-only memory (ROM), etc.), and/or a wireless interface configured to send and receive data via a wireless network, as described further with reference to FIG. 8. Each of the stations 104-114 may be configured to act in accordance with the IEEE 802.11s standard, as a non-limiting example. In other implementations, the stations 104-114 may be configured to act in accordance with other standards, such as one or more IEEE 802.11 standards, one or more Wi-Fi Alliance standards, or a combination thereof.

The first station 104 may be configured to generate a message 120 addressed to multiple stations of the wireless network 102. In a particular implementation, the message 120 may be a broadcast message (e.g., may be addressed to each other station of the wireless network 102). In other implementations, the message 120 may be a multicast message (e.g., may be addressed to a subset of the other stations in the wireless network 102). In a particular implementation, the message 120 may include a unique identifier, such as one or more bits that are encoded in the message 120 and are not encoded in other messages. For example, the message 120 may include a first identifier 124. The first station 104 may also be configured to generate a first neighbor list (List_1) 130. The first neighbor list 130 may identify "neighboring" stations (e.g., one or more stations within a one-hop range 150) of the first station. The one-hop range 150 illustrated in FIG. 1 is for convenience only and is not limiting. In a particular implementation, the one-hop range 150 may be circular and may be centered at the first station 104.

In a particular implementation, the message 120 may be a multicast message and the first neighbor list 130 may be a multicast-specific neighbor list (e.g., may indicate multiple neighboring stations to which the multicast message 120 is addressed). The stations 104-114 may each determine neighboring stations in accordance with the IEEE 802.11s standard, such as via beacons or probe request/response messages. Additionally or alternatively, the neighboring stations may be determined using a lightweight neighbor discovery mechanism. Although the first station 104 is described herein as generating the message 120 (e.g., being a source or "originating" station of the message 120), in other implementations a different station of the stations 106-114 may generate the message 120. Additionally, each of the other stations 106-114 may generate a respective neighbor list (e.g., neighbor lists 132-140).

The first station 104 may transmit the message 120 and the first neighbor list 130 to the neighboring stations. In a particular implementation, the first neighbor list 130 may be encoded with the message 120. In an alternate implementation, the first neighbor list 130 may be appended to the message 120. Each of the neighboring stations may be configured to receive the message 120 and the first neighbor list 130 and to selectively transmit (e.g., forward) the message 120 based on station-specific analysis of the first neighbor list 130, as further described herein with reference to FIG. 2.

During operation, the first station 104 may generate the message 120 and the first neighbor list 130. The first neighbor list 130 may identify the second station 106, the third station 108, and the sixth station 114 as neighboring stations of the first station 104. In a particular implementation, the first neighbor list 130 may identify the first station 104 as the source. The first station 104 may transmit the message 120 including the first neighbor list 130 and the first identifier 124 to the second station 106, the third station 108, and the sixth station 114. The stations 106, 108, and 114 may receive the message 120 and the first neighbor list 130 and may each determine whether to transmit or suppress (e.g., not transmit) the message 120 based on comparing their own neighbor lists to the first neighbor list 130, as further described with reference to FIG. 2.

Because stations that are "downstream" (e.g., the stations 106-114) of the source (e.g., the first station 104) receive the first neighbor list 130, the downstream stations may selectively transmit or suppress the message 120 based on the first neighbor list 130. Accordingly, stations may conserve power by suppressing (e.g., not transmitting) the message 120 when neighboring stations are expected to receive the message 120 from a different station. Reducing power consumption may enable the wireless network 102 to support transmission-intensive applications, such as content sharing and/or streaming (e.g., at a large event) or information sharing between distributed sensor nodes, as two non-limiting examples.

Figure 2:
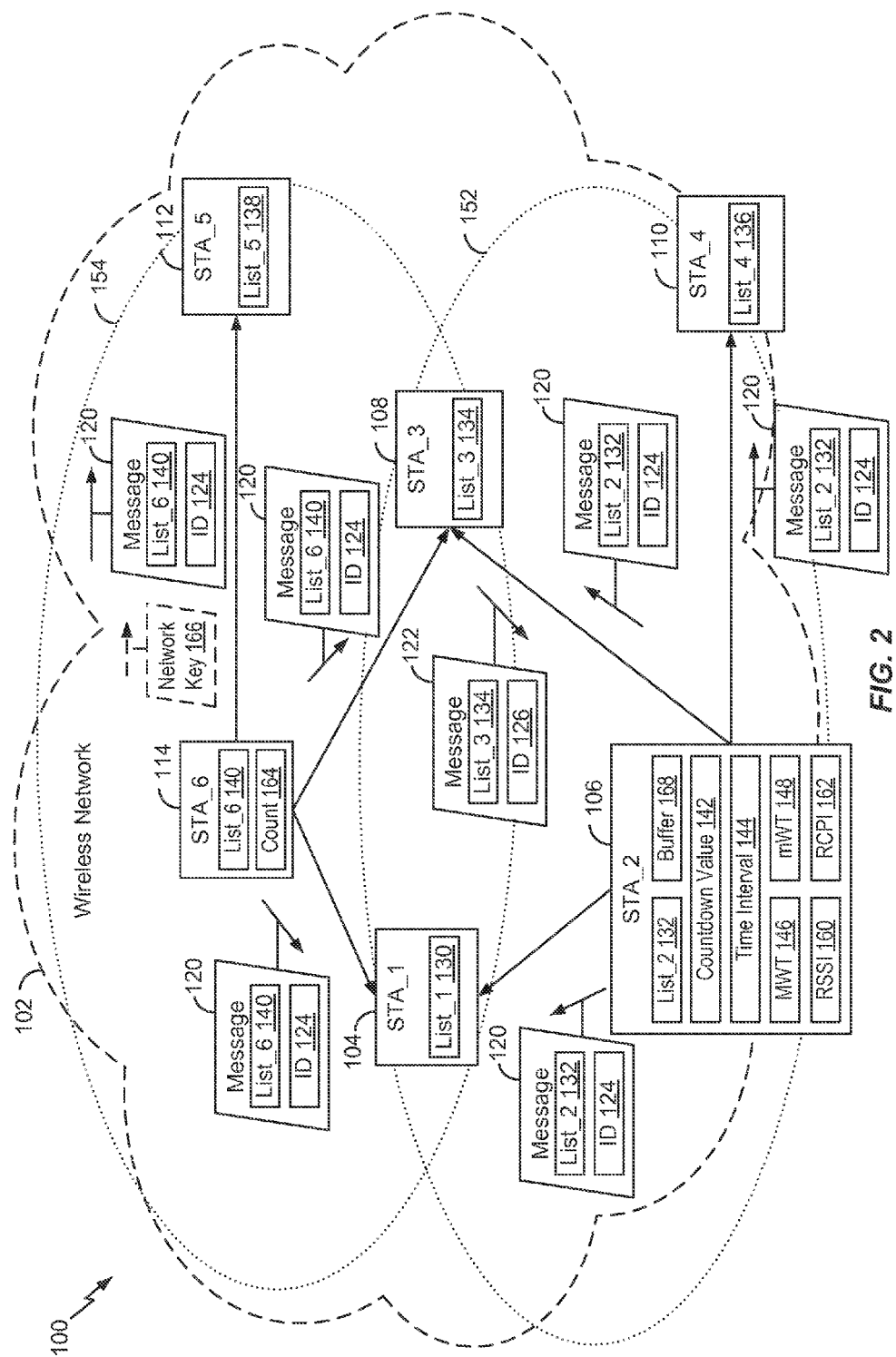
FIG. 2 is a diagram illustrating additional transmission of the message and station-specific neighbor lists in the system of FIG. 1.

FIG. 2 illustrates additional transmission of the message 120 and station-specific neighbor lists in the system 100 of FIG. 1. For example, FIG. 2 illustrates transmitting (e.g., forwarding) of the message 120 at multiple stations in the wireless network 102.

As explained with reference to FIG. 1, each of the stations 106-114 may receive the message 120 including the first neighbor list 130 from the first station 104. The stations 106-114 may be configured to selectively transmit or suppress (e.g., not transmit) the message 120 to neighboring stations based on a comparison between a station-specific neighbor list and the first neighbor list 130. The arrangement of the stations 104-114 and the one-hop ranges 152 and 154 in FIG. 2 is for illustrative purposes and is not limiting. For example, the stations 104-114 may be in any arrangement within the wireless network 102, and the one-hop ranges 152 and 154 may be circular and centered at a respective station.

For example, the second station 106 may be configured to selectively transmit the message 120 based on a comparison between the first neighbor list 130 and a second neighbor list (List_2) 132 generated by the second station 106. To illustrate, the second station 106 may compare the station(s) identified by the second neighbor list 132 to the station(s) identified by the first neighbor list 130. For example, each neighbor list identifies station(s) using station identifiers, such as media access control (MAC) addresses or other station identifiers. If each station identified by the second neighbor list 132 is also identified by the first neighbor list 130 (i.e., the second neighbor list 132 is a subset of the first neighbor list 130), the second station 106 may determine to suppress (e.g., not transmit or forward) the message 120 and to discard (e.g., delete) the message 120 without transmission. Thus, message suppression may include determining not to transmit a message and deleting or removing the message. The second station 106 may determine not to transmit the message 120 because, according to the first neighbor list 130, each neighboring station of the second station 106 is expected to receive (or has received) the message 120 from the first station 104. However, if at least one station (e.g., the fourth station 110) identified by the second neighbor list 132 is not identified by the first neighbor list 130, the second station 106 may determine to transmit (e.g., forward) the message 120 so that the at least one station is expected to receive (or will receive) the message 120. The second station 106 may also transmit the second neighbor list 132. For example, the second station 106 may transmit the message 120 and the second neighbor list 132 (e.g., the second station 106 may rebroadcast the message 120 with the second neighbor list 132 instead of the first neighbor list 130). The neighboring station(s) receiving the forwarded message 120 including the second neighbor list 132 from the second station 106 may similarly determine whether to transmit or suppress the message 120.

In a particular implementation, the second station 106 may be configured to suppress transmission of the message 120 based on the first identifier 124 included in the message 120. For example, the second station 106 may include a buffer 168 configured to store identifiers of messages. The second station 106 may store an identifier corresponding to any message transmitted by the second station 106 during a time period in the buffer 168. For example, multiple identifiers corresponding to multiple messages may be stored in the buffer 168. The time period may be selected based on a size of the buffer 168, an expiration time of an identifier, or other factors. In some implementations, the time period may be determined based on an end-to-end delay of the wireless network 102. The second station 106 may be configured to suppress transmission of (e.g., to determine not to transmit) the message 120 if a particular identifier of the message 120 is stored in the buffer 168. For example, if the message 120 was previously transmitted by the second station 106, the buffer 168 may store the first identifier 124, and the second station 106 may determine not to transmit (e.g., forward) an additional copy of the message 120 based on the buffer 168 storing the first identifier 124. Determining that a particular unique identifier is stored in the buffer may be faster and may consume less power than comparing the first neighbor list 130 and the second neighbor list 132. Thus, the stations may use the buffer 168 to determine whether to forward the message 120 prior to and/or instead of comparing neighbor lists.

Various operations, examples, and implementations described herein are described with reference to the second station 106. This is for convenience and is not limiting. For example, each of the other stations 104 and 108-114 may operate similarly to the second station 106, as described herein.

To promote fairness in the wireless network 102 (e.g., to prevent a particular station from forwarding or rebroadcasting more messages and consuming more power than other stations), the stations 104-114 may be configured to countdown from a station-specific countdown value prior to transmitting the message 120. To illustrate, the second station 106 may be configured to initiate a countdown from a countdown value 142 in response to determining to transmit the message 120. For example, the second station 106 may include a counter, a timer, or other counting or timing logic configured to generate the countdown value 142 and to perform the countdown from the countdown value 142.

In a particular implementation, the second station 106 may generate the countdown value 142 by randomly selecting the countdown value 142 from a range between zero and a maximum waiting time (MWT) value, such as a MWT value 146. In one example, the MWT value 146 may be pre-generated and stored at the second station 106, and may be the same for each of the stations 104-114. Thus, the countdown value may be a random value, or a pseudo-random value, between zero and the MWT value 146. In response to the countdown reaching zero, the second station 106 may transmit (e.g., forward) the message 120 including the second neighbor list 132. Although initiating the countdown is described as occurring after determining whether to transmit the message 120, in other implementations, initiating the countdown and determining whether to transmit the message 120 may occur in any order prior to transmitting or suppressing of the message 120.

The countdown at a station may be stopped based on receiving one or more additional messages. For example, after determining to transmit the message 120, the second station 106 may initiate the countdown from the countdown value 142, as described above. During the countdown (e.g., before the countdown reaches zero), the second station 106 may receive an additional message. For example, the second station 106 may receive the additional message and a third neighbor list from a station that is within a one-hop range 152 of the second station 106. In a non-limiting example, the second station 106 may receive a second message 122 including a third neighbor list (List_3) 134 and a second identifier 126 from the third station 108. The second identifier 126 may be the same as the first identifier 124 included in the message 120 (e.g., the second message 122 may be the message 120 forwarded or rebroadcast from the third station 108). The second station 106 may compare the second neighbor list 132 to the third neighbor list 134, as described above. In response to determining that each station identified by the second neighbor list 132 is also identified by the third neighbor list 134, the second station 106 may determine not to transmit the message 120. The determination may occur before the countdown reaches zero or when the countdown reaches zero. The second station 106 may also stop the countdown if no other messages are pending transmission/forwarding at the second station 106. However, if one or more messages are pending transmission/forwarding, the countdown may continue. Thus, each device may implement a single countdown for all group-addressed messages.

In a particular implementation, the second station 106 may perform a separate countdown for each message having a different identifier. For example, if the second identifier 126 included in the second message 122 is different than the first identifier 124 included in the message 120, the station 106 may process the second message 122 (including initiating a second countdown from a second value) as described above. In an alternate implementation, the second station 106 may perform a single countdown (e.g., using a single timer) for multiple messages. As a non-limiting example, the second message 122 may be different than the message 120. The second identifier 126 may be different than the first identifier 124. The second station 106 may be configured to determine whether at least one station identified by the second neighbor list 132 is not identified by the third neighbor list 134. In response to determining that the at least one station is not identified by the third neighbor list 134, the second station 106 may determine to transmit the second message 122 when the second countdown is complete. For example, when the countdown reaches zero, the second station 106 may transmit both the message 120 and the second message 122. The second neighbor list 132 may be encoded in or appended to each of the message 120 and a forwarded copy of the second message 122, as described above. Thus, the single countdown may be used to transmit multiple messages (e.g., messages having different identifiers).

In a particular implementation, the MWT value 146 may be independently determined at each station and may different for one or more of the stations 104-114. For example, the second station 106 may be configured to determine the MWT value 146 based on a number of neighboring stations of the second station 106. As referred to herein, a Degree(A) function returns the number of neighboring stations of the argument A (e.g., a particular station). In this implementation, the second station 106 may be configured to determine its number of neighboring stations using the Degree( ) function and to determine the MWT value 146 based on an inverse of the result. Accordingly, the MWT value 146 may be inversely proportional to the number of stations that neighbor the second station 106 (e.g., a number of stations identified by the second neighbor list 132). Determining the MWT value 146 based on the number of neighboring stations may reduce an overall power consumption of the wireless network 102. For example, stations within a one-hop range of a large number of stations may have a smaller MWT value and may be more likely to transmit messages (and reach a greater number of neighboring stations) than stations within range of a small number of stations, thereby reducing a total number of stations that transmit messages and the overall power consumption related to message propagation.

In a particular implementation, the MWT value 146 may be determined based on whether the particular station is a "new" member of (e.g., has recently joined) the wireless network 102. For example, the second station 106 may be configured to determine a lower value for the MWT 146 value (e.g., a value that is lower than the MWT value of other stations) when the second station 106 initially joins the wireless network 102. Accordingly, the second station 106 may be more likely to transmit a received message, such as the message 120, when the second station 106 initially joins the wireless network 102. Determining lower values as the MWT values at "new" stations enables the "new" stations to announce their presence to other stations in the wireless network 102. Additionally, fairness may be increased by causing the second station 106 to initially contribute to the forwarding of messages in the wireless network 102.

Additionally or alternatively, the second station 106 may generate the countdown value 142 by selecting the countdown value 142 from a range between a minimum wait time (mWT) value 148 and the MWT value. The mWT value 148 may be determined based on received signal strength of the message 120. For example, the second station 106 may be configured to determine a received signal strength indication (RSSI) 160 for the message 120 received from the first station 104. The second station 106 may be further configured to select the countdown value 142 from the range between the mWT value 148 and the MWT value 146 in response to the RSSI 160 exceeding a threshold value. In a particular implementation, the mWT value 146 may be a pre-generated value that is greater than zero and is the same for each of the stations 104-114. Alternatively, the mWT value 146 may be independently determined by the stations 104-114 based on a station-specific RSSI 160. Selecting the countdown value 142 from the range between the mWT 148 value and the MWT value 146 instead of from the range between zero and the MWT 146 value reduces a likelihood that a particular station will transmit the message 120. For example, the RSSI 160 may be higher when the particular station is near the source of the message 120 (e.g., the first station 104). Thus, reducing a likelihood of transmission based on a high RSSI enables stations located near the source of a message to keep silent longer. Efficiency in dense wireless networks may thereby be increased, because stations located near the source are likely within a one-hop range of only a few additional stations that are not in range of the source.

In a particular implementation, the second station 106 may generate the countdown value 142 by selecting the countdown value 142 from the range between the mWT value 148 and the MWT value 146 based on channel power of the message 120. For example, the second station 106 may be configured to determine a received channel power indication (RCPI) 162 for the message 120 received from the first station 104. The second station 106 may be further configured to select the countdown value 142 from the range between the mWT value 148 and the MWT value 146 in response to the RCPI 162 exceeding a threshold value. In a particular implementation, the mWT value 146 may be a pre-generated value that is greater than zero and is the same for each of the stations 104-114. Alternatively, the mWT value 146 may be individually determined by the stations 104-114 based on a station-specific RCPI. Selecting the countdown value 142 based on the RCPI may provide similar benefits in dense wireless networks as described above.

Additionally or alternatively, the second station 106 may be configured to determine whether a particular time interval 144 has lapsed. The particular time interval 144 may not be randomly selected and may be independent of the countdown from the randomly, or pseudo-randomly, selected countdown value 142 described above. The second station 106 may be configured to monitor a number of messages transmitted during the particular time interval 144 and to determine whether at least one message was transmitted during the particular time interval 144. In response to determining that zero messages have been transmitted during the particular time interval 144, the second station 106 may transmit a received message, such as the message 120, and the second neighbor list 132. In a particular implementation, the second station 106 may be an edge station or a border station (e.g., a station located at the edge of the wireless network 102). Transmitting the message 120 including the second neighbor list 132 may signal a presence of the wireless network 102 to "outside" stations. Additionally, transmitting the message 120 (including the second neighbor list 132) when no messages have been transmitted during the particular time interval 144 may ensure that the edge station or the border station participates in message forwarding (e.g., by transmitting the message 120). After the particular time interval 144 has lapsed, the above-described process may be repeated for each subsequent time interval.

In a particular implementation, each station may be configured to determine whether to remove stations from the wireless network 102 based on contributions of the stations. For example, the sixth station 114 may be configured to monitor a number of messages received from the fifth station 112 during a time period. The sixth station 114 may maintain a count 164 of the number of messages, and transmissions of a fifth neighbor list 138, received from the fifth station 112 during the time period. The sixth station 114 may be further configured to determine whether to transmit a network key 166 to the fifth station 112 based on the count 164. For example, the network key 166 may be used by the stations 104-114 to encrypt messages prior to transmitting the messages or to decrypt received messages. When the sixth station 114 receives the network key 166 from another station, the sixth station 114 may determine whether to transmit the network key 166 to the fifth station 112. The sixth station 114 may transmit the network key 166 to the fifth station 112 in response to determining that the number of messages (e.g., the count 164) exceeds a threshold. The threshold may represent a desired minimum contribution level of each station to message propagation in the wireless network 102.

The sixth station 114 may suppress transmission of the network key 166 to the fifth station 112 in response to determining that the number of messages (e.g., the count 164) does not exceed the threshold. Suppressing transmission of the network key 166 may effectively remove the fifth station 112 from the wireless network 102, because the fifth station 112 will be unable to encrypt and send messages or to decrypt received messages without the network key. In an alternate implementation, the sixth station 114 may determine whether to transmit the network key 166 to the fifth station 112 based on whether a score corresponding to the fifth station 112 exceeds a threshold score. The score may be based at least in part on the number of messages received from the fifth station 112. The score may also be based on other scoring criteria corresponding to the fifth station 112, such as proximity to transmission sources, network seniority, length of time in the wireless network 102, historical transmission data, and other factors.

During operation, the second station 106, the third station 108, and the sixth station 114 may each receive the message 120 and the first neighbor list 130 from the first station 104 and may determine whether to transmit (e.g., forward or rebroadcast) the message 120 based on the first neighbor list 130. For example, the stations 106, 108, and 114 may compare their own neighbor lists to the first neighbor list 130, as described above. In the example illustrated in FIG. 2, each of the stations 106, 108, and 114 determines that at least one station identified by the second neighbor list 132, the third neighbor list 134, or a sixth neighbor list (List_6) 140, respectively, is not identified by the first neighbor list 130. In response, the stations 106, 108, and 114 may determine to transmit the message 120 and may start station-specific countdowns from randomly generated countdown values.

At a first time, the second station 106 may complete the countdown. The second station 106, in response to completing the countdown, may transmit the message 120 and the second neighbor list 132 to the third station 108, to the fourth station 110, and to the first station 104 (e.g., the neighboring stations within the one-hop range 152 of the second station 106). The first station 104 may discard the message 120 because the first station 104 has already transmitted the message 120. At a second time subsequent to the first time, the sixth station 114 may complete the countdown. The sixth station 114 may transmit the message 120 and the sixth neighbor list 140 to the third station 108, to the fifth station 112, and to the first station 104 (e.g., the neighboring stations within a one-hop range 154 of the sixth station 114). The first station 104 may discard the message 120 because the first station 104 has already transmitted the message 120.

The third station 108 may receive the second neighbor list 132 and the sixth neighbor list 140 (along with transmissions of the message 120) from the second station 106 and the sixth station 114, respectively. The third station 108 may compare the third neighbor list 134 to the second neighbor list 132, the sixth neighbor list 140, or a combination thereof. In response to determining that each station identified by the third neighbor list 134 is also identified by the second neighbor list 132, the sixth neighbor list 140, or the combination thereof, the third station 108 may suppress transmission of the message 120. In some implementations, the determination to suppress transmission may occur when the countdown reaches zero. In other implementations, the determination to suppress transmission may occur before the countdown reaches zero (e.g., prior to completion). Additionally, the third station 108 may stop the countdown prior to completion if no other messages are pending transmission/forwarding at the third station 108. In an alternate implementation, the third station 108 may complete the countdown prior to the second station 106 and the sixth station 114, and may transmit the second message 122 and the third neighbor list 134 to neighboring stations. In this implementation, the second station 106 may suppress transmission of the message 120 based on a comparison between the second neighbor list 132 and the third neighbor list 134, and the sixth station 114 may suppress transmission of the message 120 based on a comparison between the sixth neighbor list 140 and the third neighbor list 134.

By using countdowns from randomly generated countdown values (e.g., values that are randomly selected from one or more ranges), or pseudo-randomly selected countdown values, each station may have an opportunity to contribute to propagation of a message or to conserve power by suppressing transmission of the message. In this manner, fairness between stations in the wireless network 102 is promoted, because each station has a random chance, or pseudo-random chance, of transmitting a received message. Thus, maximum power consumption of each station related to message propagation may be reduced in a fair manner.

Figure 3:
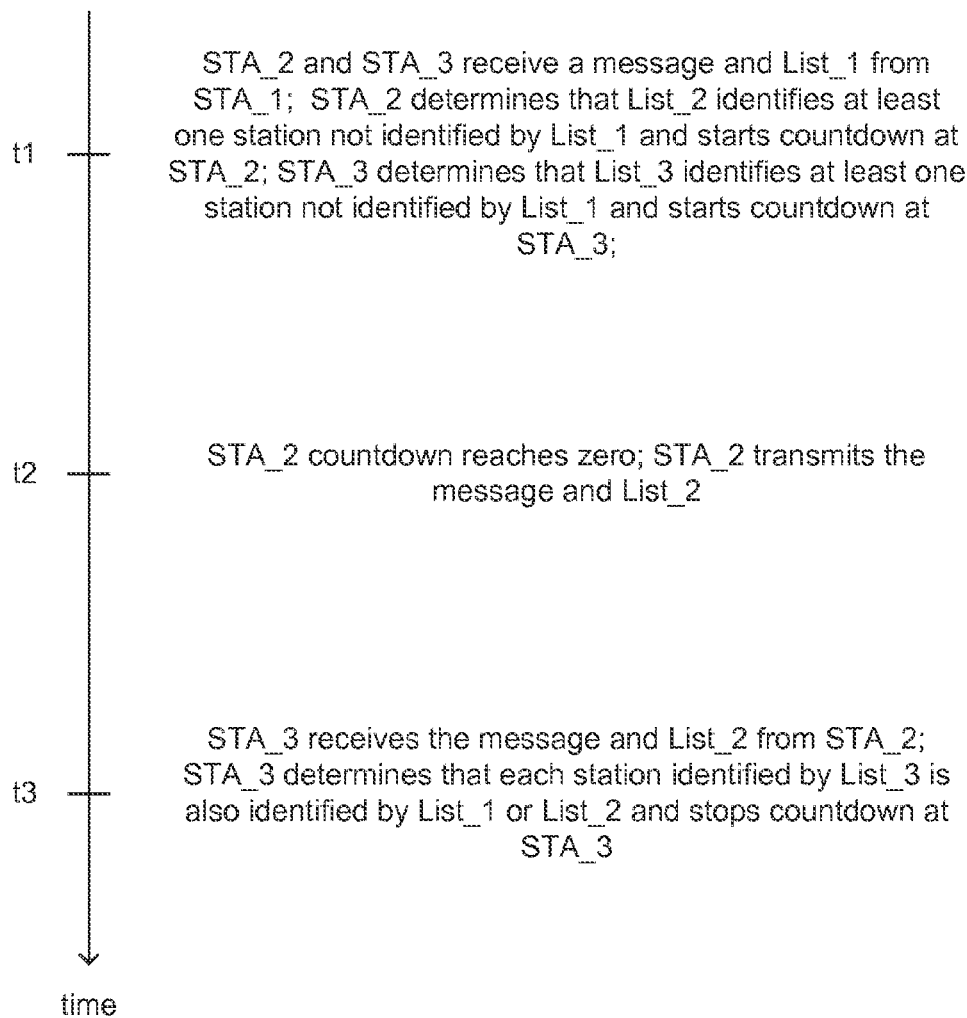
FIG. 3 is a diagram of a first illustrative example of message and station specific neighbor list transmission in a wireless network.

FIG. 3 illustrates a timing diagram 300 of a first illustrative example of message and station-specific neighbor list transmission in a wireless network. The timing diagram 300 illustrates communication between three stations in the wireless network, such as the stations 104-108 of FIGS. 1-2. In the example of FIG. 3, the stations may be arranged such that the second station (STA_2) 106 and the third station (STA_3) 108 neighbor the first station (STA_1) 104, and such that the third neighbor list (List_3) 134 is a subset of the second neighbor list (List_2) 132.

At a first time (t1), the second station 106 and the third station 108 each receive a message and the first neighbor list (List_1) 130 from the first station 104. The first neighbor list 130 may identify the second station 106 and the third station 108 as neighboring stations of the first station 104. The second station 106 may determine that at least one station identified by the second neighbor list 132 is not identified by the first neighbor list 130 and may start a countdown at the second station 106, as described with reference to FIG. 2. Additionally, the third station 108 may determine that at least one station identified by the third neighbor list 134 is not identified by the first neighbor list 130 and may start a countdown at the third station 108, as described with reference to FIG. 2.

At a second time (t2), the countdown at the second station 106 reaches zero. Thus, in the example of the timing diagram 300, the countdown value (e.g., the random/pseudo-random value selected from one or more ranges) generated by the second station 106 is lower than the countdown value generated by the third station 108. In response to completing the countdown, the second station 106 transmits (e.g., forwards or rebroadcasts) the message and the second neighbor list 132 to its neighboring station(s). In a particular implementation, the second station 106 may be a neighboring station of the third station 108.

At a third time (t3), the third station 108 receives the message and the second neighbor list 132 from the second station 106 and compares the third neighbor list 134 to the second neighbor list 132. In response to determining that each station identified by the third neighbor list 134 is also identified by the second neighbor list 132 (e.g., each neighboring station of the third station 108 is also a neighboring station of the second station 106) or the first neighbor list 130 (as explained above), the third station 108 stops the countdown (when no other messages are pending transmission/forwarding) and suppresses transmission of the message, as described with reference to FIG. 2. Although comparing the first neighbor list 130 and the third neighbor list 134 is described as occurring at time t1, in another implementation, the comparison may occur at time t3 or may occur at times t1 and t3.

Figure 4:
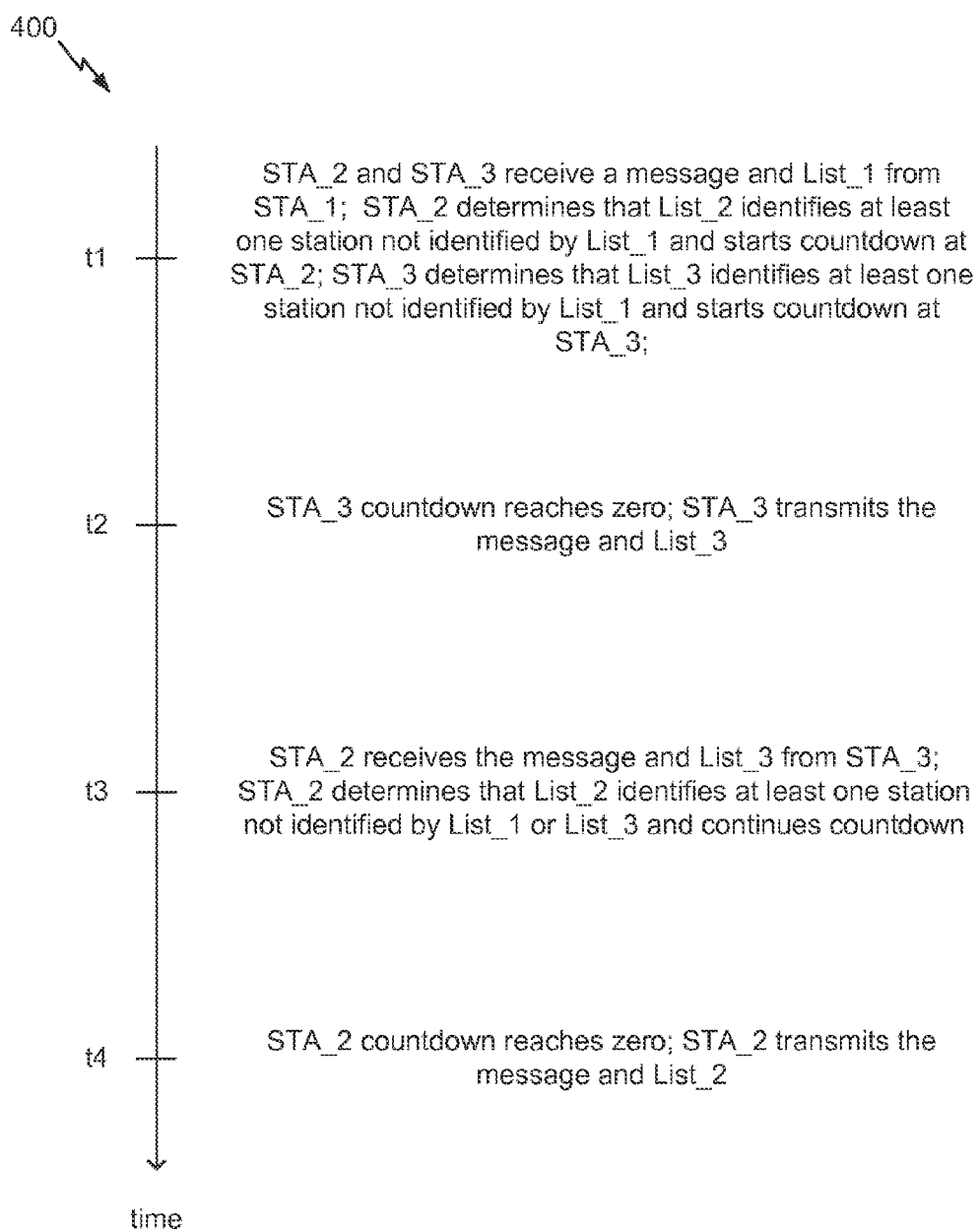
FIG. 4 is a diagram of a second illustrative example of message and station specific neighbor list transmission in a wireless network.

FIG. 4 illustrates a timing diagram 400 of a second illustrative example of message and station-specific neighbor list transmission in a wireless network. The timing diagram 400 illustrates communication between three stations in the wireless network, such as the stations 104-108 of FIGS. 1-2. In the example of FIG. 3, the stations may be arranged such that the second station (STA_2) 106 and the third station (STA_3) 108 neighbor the first station (STA_1) 104, and such that the second neighbor list (List_2) 132 identifies at least one station that is not identified by the third neighbor list (List_3) 134. The example of FIG. 4 also differs from the example of FIG. 3 in that the third station 108 generates a lower countdown value than the second station 106.

At a first time (t1), the second station 106 and the third station 108 operate as described with reference to the first time (t1) of FIG. 3. At a second time (t2), the countdown at the third station 108 reaches zero. In response to completing the countdown, the third station 108 transmits (e.g., forwards or rebroadcasts) the message and the third neighbor list 134 to its neighboring station(s). In a particular implementation, the second station 106 may be a neighboring station of the third station 108.

At a third time (t3), the second station 106 receives the message and the third neighbor list 134 from the third station 108 and compares the second neighbor list 132 to the third neighbor list 134. In response to determining that at least one station identified by the second neighbor list 132 is not identified by the third neighbor list 134 (e.g., at least one neighboring station of the second station 106 is not a neighboring station of the third station 108) or the first neighbor list 130 (as explained above), the second station 106 continues the countdown. Although comparing the first neighbor list 130 and the second neighbor list 132 is described as occurring at time t1, in another implementation, the comparison may occur at time t3 or may occur at times t1 and t3.

At a fourth time (t4), the countdown at the second station 106 reaches zero. In response to completing the countdown, the second station 106 transmits the message and the second neighbor list 132 to its neighboring station(s).

Figure 5:
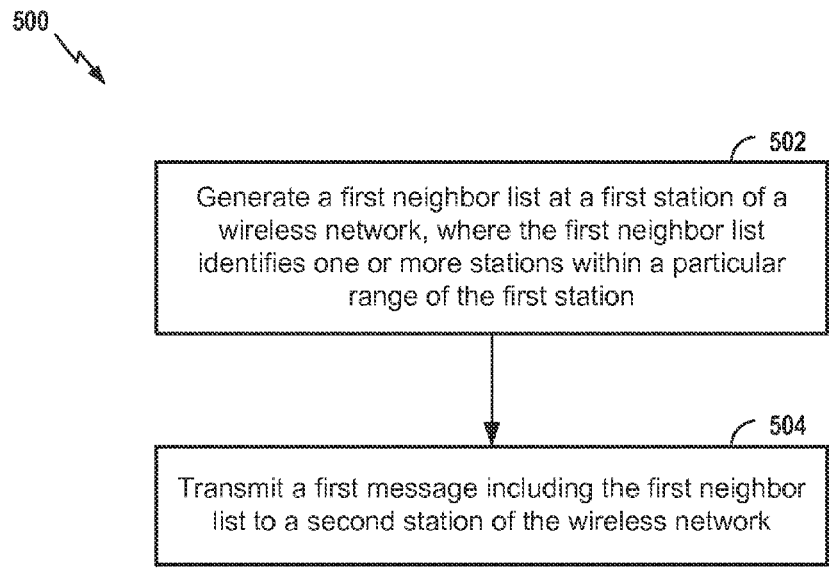
FIG. 5 is a flow diagram of an illustrative method of transmitting a message and a neighbor list in a wireless network.

Referring to FIG. 5, an illustrative method of transmitting a message and a neighbor list in a wireless network is described and designated 500. The method 500 may be performed using the stations 104-114 and the wireless network may include or correspond to the wireless network 102 of FIGS. 1-2.

The method 500 may include generating a first neighbor list at a first station of the wireless network, at 502. For example, the first neighbor list may include or correspond to the first neighbor list 130 and the first station may include or correspond to the first station 104 of FIG. 1. The first neighbor list may identify one or more stations within a particular range of the first station. In a particular implementation, the particular range is a one-hop range of the first station, such as the one-hop range 150 of FIG. 1.

The method 500 may further include transmitting a first message including the first neighbor list to a second station of the wireless network, at 504. For example, the first message may include or correspond to the message 120 and the second station may include or correspond to the second station 106 of FIG. 1. In a particular implementation, the first neighbor list may be encoded in the message. Additionally or alternatively, the first message may include a multicast message. In a particular implementation, the neighbor list may be a multicast-specific neighbor list. The multicast-specific neighbor list may include a subset of stations within the particular range of the first station. In another particular implementation, the first message may include a broadcast message. Additionally or alternatively, the message may include a unique identifier, such as the first identifier 124 of FIG. 1. In another particular implementation, the second station may be identified in the first neighbor list. Alternatively, the second station may not be identified in the first neighbor list.

The method 500 may enable the first station to transmit a message and a neighbor list to stations for use in selective transmission (e.g., forwarding) of the message.

Figure 6:
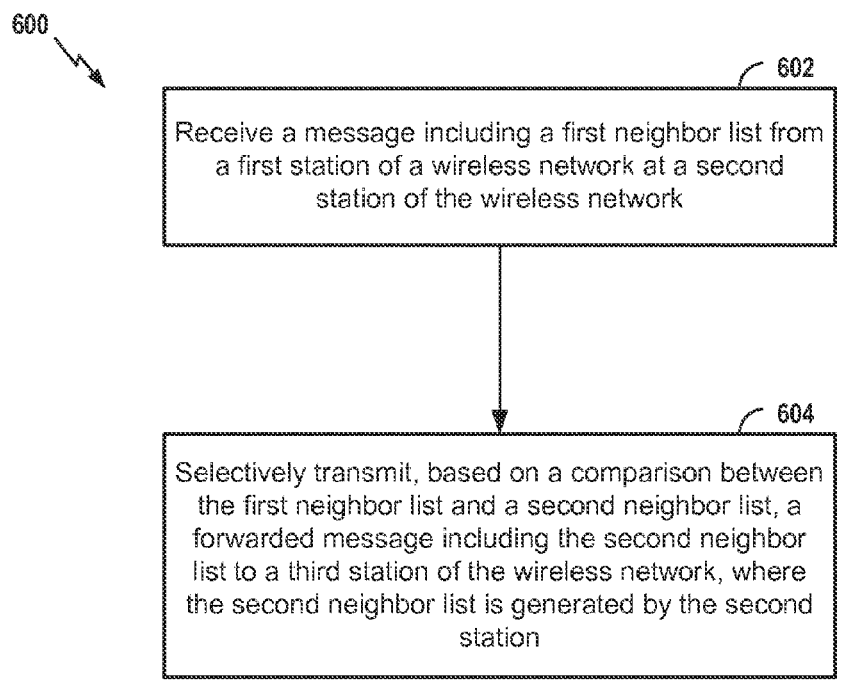
FIG. 6 is a flow diagram of an illustrative method of selectively transmitting a message and a neighbor list in a wireless network.

Referring to FIG. 6, an illustrative method of selectively transmitting a message and a neighbor list in a wireless network is described and designated 600. The method 600 may be performed using the stations 104-114 and the wireless network may include or correspond to the wireless network 102 of FIGS. 1-2.

The method 600 may include receiving a message including a first neighbor list from a first station of the wireless network at a second station of the wireless network, at 602. For example, the first station may include or correspond to the first station 104, the second station may include or correspond to the second station 106, the message may include or correspond to the message 120, and the first neighbor list may include or correspond to the first neighbor list 130 of FIGS. 1-2. In a particular implementation, the method 600 may be performed after the method 500 of FIG. 5, and the message received may have a different identifier than the first message described with reference to FIG. 5.

The method 600 may further include selectively transmitting, based on a comparison between the first neighbor list and a second neighbor list, a copy of the message and the second neighbor list to another station of the wireless network, at 604. The second neighbor list may be generated by the second station. For example, the second neighbor list may include or correspond to the second neighbor list 132 of FIGS. 1-2. In a particular implementation, the first neighbor list may identify one or more stations within a one-hop range of the first station, and the second neighbor list may identify one or more stations within a one-hop range of the second station.

In a particular implementation, the second station may compare the first neighbor list to the second neighbor list and determine whether at least one station identified by the second neighbor list is not identified by the first neighbor list. The second station may suppress transmission of (e.g., determine not to transmit) the copy of the message in response to determining that each station identified by the second neighbor list is also identified by the first neighbor list. Additionally or alternatively, the second station may suppress transmission of (e.g., determine not to transmit) the copy of the message in response to determining that the second station has already transmitted another message with a same unique identifier as the message during a time period. In a particular implementation, the second station may store an identifier corresponding to each message transmitted by the second station during the time period in a buffer, such as the buffer 168 of FIG. 2. The duration of the time period may be determined based on an end-to-end delay of the wireless network. For example, the duration of the time period may be determined based on the end-to-end delay of the wireless network 102 of FIGS. 1-2.

Additionally or alternatively, the second station may initiate a countdown from a particular value generated at the second station in response to determining that at least one station identified by the second neighbor list is not identified by the first neighbor list. In a particular implementation, the second station may generate the particular value by randomly selecting the particular value from a range between a zero value and a maximum waiting time (MWT) value. For example, with reference to FIG. 2, the second station 106 may generate the countdown value 142 by randomly selecting the countdown value 142 from a range between zero and the MWT value 146. The second station may transmit a copy of the message including the second neighbor list in response to the countdown reaching zero. For example, with reference to FIG. 2, the second station 106 may initiate a countdown using the countdown value 142 and may transmit (e.g., forward) the message 120 including the second neighbor list 132 in response to the countdown reaching zero. In a particular implementation, the MWT value may be the same for each station in the wireless network.

Additionally or alternatively, the second station may receive a second message and a third neighbor list from a third station of the wireless network prior to the countdown reaching zero. For example, with reference to FIG. 2, the second station 106 may receive the second message 122 including the third neighbor list 134 from the third station 108. The second station may determine that the first message and the second message have the same identifier. For example, the second station 106 may receive the second message 122 and determine that the first identifier 124 and the second identifier 126 are the same. The second station may determine whether at least one station identified by the second neighbor list is not identified by the third neighbor list and may transmit a copy of the second message and the second neighbor list in response to the countdown reaching zero and conditioned on determining that the at least one station identified by the second neighbor list is not identified by the third neighbor list. For example, the second station 106 may transmit the message 120 (e.g., a copy of the message received from the first station 104). Additionally or alternatively, the second station may receive the second message and the third neighbor list from the third station of the wireless network prior to the countdown reaching zero. The second message and the message may have a same unique identifier. For example, the first identifier 124 and the second identifier 126 may be the same. The second station may determine whether at least one station identified by the second neighbor list is not identified by the third neighbor list and the second station may determine not to transmit a copy of the second message in response to determining that each station identified by the second neighbor list is also identified by the third neighbor list. The second station may determine not to transmit a copy of the second message prior to the countdown reaching zero or when the countdown reaches zero. In a particular implementation, the second station may stop the countdown prior to completion when no other messages are pending transmission/forwarding.

In another particular implementation, the second station may determine a number of stations identified by the second neighbor list and determine the MWT value based on the number of stations. For example, the MWT value, such as the MWT value 146 of FIG. 2, may be inversely proportional to the number of stations.

In another particular implementation, the second station may determine a received signal strength indicator (RSSI) for the message and randomly select the particular value from a range between a minimum waiting time (mWT) value and a maximum waiting time (MWT) value in response to the RSSI exceeding a threshold value. For example, with reference to FIG. 2, the second station 106 may generate the countdown value 142 by randomly selecting the countdown value 142 from a range between the mWT value 148 and the MWT value 146 in response to the RSSI 160 exceeding a threshold value. In a particular implementation, the mWT value may be greater than zero and may be the same for each station in the wireless network. Alternatively, the second station may determine the mWT value based on the RSSI. Additionally or alternatively, the second station may determine a received channel power indication (RCPI) for the message and may randomly select the particular value from a range between an mWT value and an MWT value in response to the RCPI exceeding a threshold value. For example, with reference to FIG. 2, the second station 106 may generate the countdown value 142 by randomly selecting the countdown value 142 from a range between the mWT value 148 and the MWT value 146 in response to the RCPI 162 exceeding a threshold value. In a particular implementation, the second station may determine the mWT value based on the RCPI.

In another particular implementation, the second station may determine whether the second station has transmitted at least one message during a particular time interval. For example, with reference to FIG. 2, the second station 106 may determine whether at least one message has been transmitted during the particular time interval 144. The second station may transmit the message including the second neighbor list in response to determining that the second station has not transmitted at least one message during the particular time interval.

The method 600 may enable selective transmission or suppression of messages at stations in the wireless network.

Figure 7:
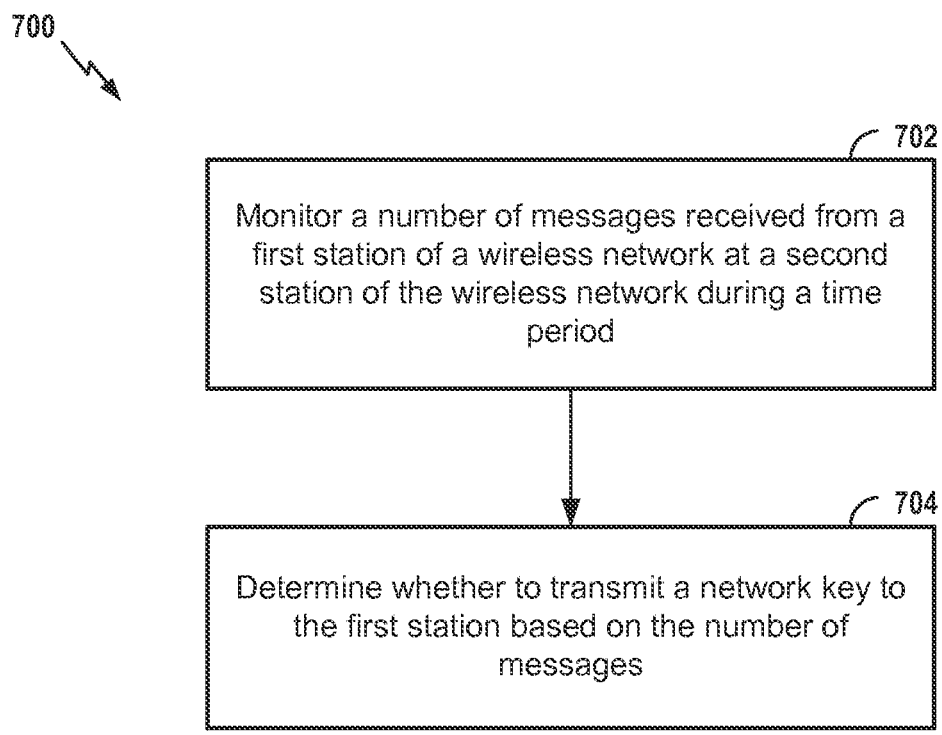
FIG. 7 is a flow diagram of an illustrative method of selectively removing a station from a wireless network based on a number of messages received during a particular time period.

Referring to FIG. 7, an illustrative method of selectively removing a station in a wireless network is described and designated 700. The method 700 may be performed using the stations 104-114 and the wireless network may include or correspond to the wireless network 102 of FIGS. 1-2.

The method 700 may include monitoring a number of messages received from a first station of a wireless network at a second station of the wireless network during a time period, at 702. For example, with reference to FIG. 2, the sixth station 114 may monitor the count 164 of the number of messages received from the fifth station 112.

The method 700 may further include determining whether to transmit a network key to the first station based on the number of messages, at 704. For example, with reference to FIG. 2, the sixth station 114 may determine whether to transmit the network key 166 to the fifth station 112 based on the count 164. In a particular implementation, each of the messages received from the first station may include a neighbor list corresponding to the first station. In another particular implementation, the second station may determine to transmit the network key to the first station in response to the number of messages exceeding a threshold value. Additionally or alternatively, the second station may determine to transmit the network key to the first station in response to a score corresponding to the second station exceeding a threshold value. The score may be based at least in part on the number of messages, or on other scoring criteria, as described with reference to FIG. 2. Additionally or alternatively, the second station may suppress transmission of (e.g., determine not to transmit) the network key to the first station in response to the number of messages failing to exceed a threshold value.

The method 700 may enable the first station to selectively remove the second station from the wireless network via selective transmission of the network key based on the number of messages received from the second station.

Figure 8:
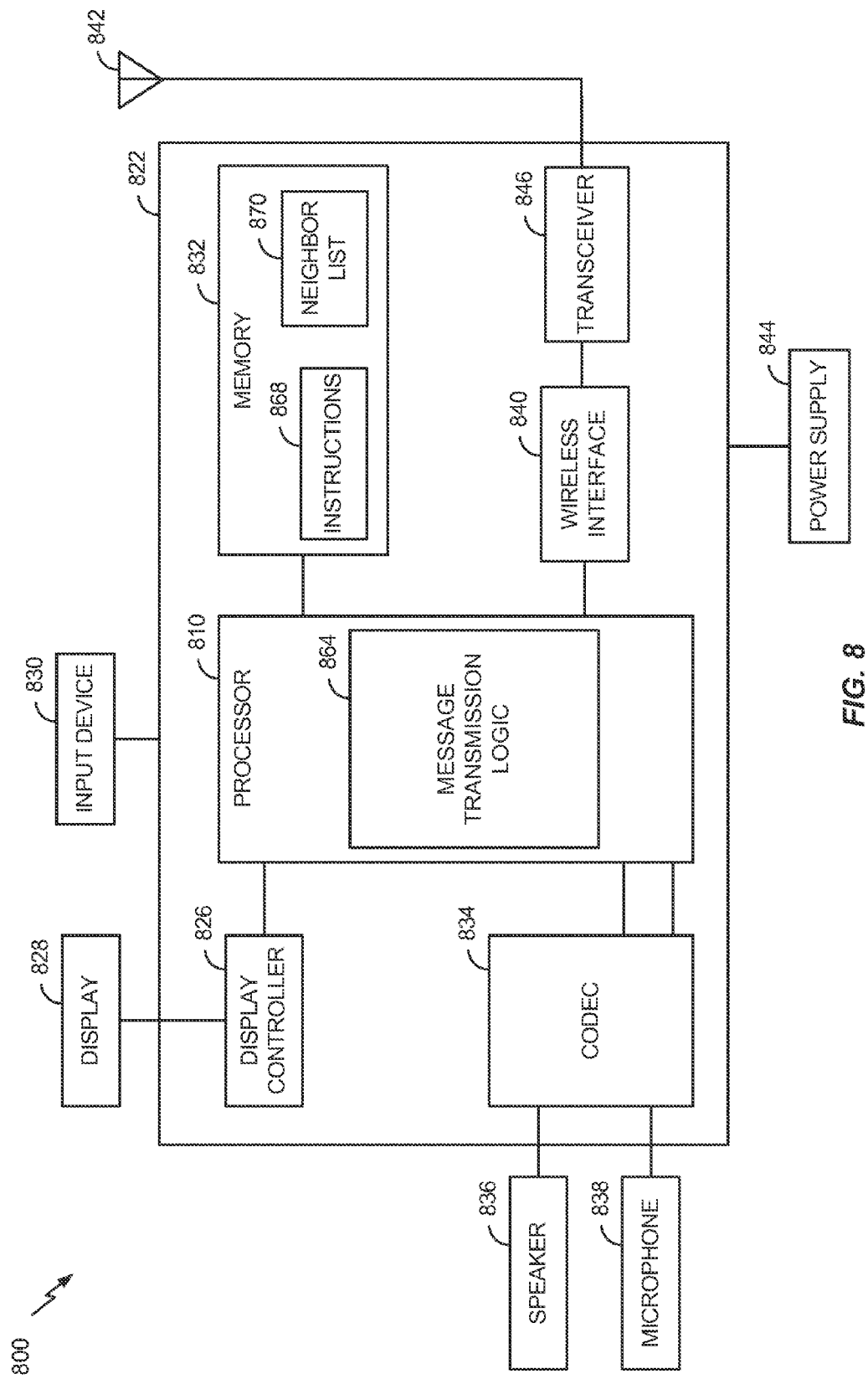
FIG. 8 is a diagram of a wireless device that is operable to support various aspects of one or more methods, systems, apparatuses, and/or computer-readable media disclosed herein.

Referring to FIG. 8, a particular illustrative aspect of a wireless communication device is depicted and generally designated 800. The device 800 includes a processor 810, such as a digital signal processor, coupled to a memory 832. In an illustrative implementation, the device 800, or components thereof, may correspond to the stations 104-114 of FIGS. 1-2, or components thereof.

The processor 810 may be configured to execute software (e.g., a program of one or more instructions 868) stored in the memory 832. Additionally or alternatively, the processor 810 may be configured to implement one or more instructions stored in a memory of a wireless interface 840 (e.g., an IEEE 802.11 interface). For example, the wireless interface 840 may be configured to operate in accordance with the IEEE 802.11s standard. In a particular implementation, the processor 810 may be configured to operate in accordance with one or more of the methods of FIGS. 5-7. For example, the processor 810 may include message transmission logic 864 to execute one or more of the methods of FIGS. 5-7. The processor 810 may also be configured to generate and store a neighbor list 870 for the device 800. In an illustrative implementation, the neighbor list 870 may identify one or more neighboring stations of the device 800 in the wireless network 102 of FIGS. 1-2.

The wireless interface 840 may be coupled to the processor 810 and to an antenna 842. For example, the wireless interface 840 may be coupled to the antenna 842 via a transceiver 846, such that wireless data received via the antenna 842 and may be provided to the processor 810.

A coder/decoder (CODEC) 834 can also be coupled to the processor 810. A speaker 836 and a microphone 838 can be coupled to the CODEC 834. A display controller 826 can be coupled to the processor 810 and to a display device 828. In a particular implementation, the processor 810, the display controller 826, the memory 832, the CODEC 834, and the wireless interface 840 are included in a system-in-package or system-on-chip device 822. In a particular implementation, an input device 830 and a power supply 844 are coupled to the system-on-chip device 822. Moreover, in a particular implementation, as illustrated in FIG. 8, the display device 828, the input device 830, the speaker 836, the microphone 838, the antenna 842, and the power supply 844 are external to the system-on-chip device 822. However, each of the display device 828, the input device 830, the speaker 836, the microphone 838, the antenna 842, and the power supply 844 can be coupled to one or more components of the system-on-chip device 822, such as one or more interfaces or controllers.

In conjunction with the described implementation, a first apparatus includes means for generating a first neighbor list at a first station of a wireless network, where the first neighbor list identifies one or more stations within a particular range of the first station. For example, the means for generating may include the stations 104-114 of FIGS. 1-2, the wireless interface 840, the processor 810 programmed to execute the instructions 868, the message transmission logic 864 of FIG. 8, other devices, circuits, modules, or instructions to generate a neighbor list at a first station of a wireless network, or any combination thereof.

The first apparatus also includes means for transmitting a first message including the first neighbor list to a second station of the wireless network. For example, the means for transmitting may include the stations 104-114 of FIGS. 1-2, the wireless interface 840, the processor 810 programmed to execute the instructions 868, the message transmission logic 864 of FIG. 8, other devices, circuits, modules, or instructions to transmit a message including a neighbor list to a second station of a wireless network, or any combination thereof.

In conjunction with the described implementation, a second apparatus includes means for receiving a message and a first neighbor list from a first station of a wireless network at a second station of the wireless network. For example, the means for receiving may include the stations 104-114 of FIGS. 1-2, the wireless interface 840, the processor 810 programmed to execute the instructions 868, the message transmission logic 864 of FIG. 8, other devices, circuits, modules, or instructions to receive a message and a first neighbor list from a first station of a wireless network at a second station of the wireless network, or any combination thereof.

The second apparatus also includes means for selectively transmitting, based on a comparison between the first neighbor list and a second neighbor list, the message and the second neighbor list to another station in the wireless network, where the second neighbor list is generated by the second station. For example, the means for selectively transmitting may include the stations 104-114 of FIGS. 1-2, the wireless interface 840, the processor 810 programmed to execute the instructions 868, the message transmission logic 864 of FIG. 8, other devices, circuits, modules, or instructions to selectively transmit, based on a comparison between the first neighbor list and a second neighbor list, the message and the second neighbor list to another station in the wireless network, or any combination thereof.

In conjunction with the described implementation, a third apparatus includes means for monitoring a number of messages received from a first station of a wireless network at a second station of the wireless network during a time period. For example, the means for monitoring may include the stations 104-114 of FIGS. 1-2, the wireless interface 840, the processor 810 programmed to execute the instructions 868, the message transmission logic 864 of FIG. 8, other devices, circuits, modules, or instructions to monitor a number of messages received from a first station of a wireless network at a second station of the wireless network during a time period, or any combination thereof.

The third apparatus also includes means for determining whether to transmit a network key to the first station based on the number of messages. For example, the means for determining may include the stations 104-114 of FIGS. 1-2, the wireless interface 840, the processor 810 programmed to execute the instructions 868, the message transmission logic 864 of FIG. 8, other devices, circuits, modules, or instructions to determine whether to transmit a network key to the second station based on the number of messages, or any combination thereof.

Those of skill in the art would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the disclosure herein may be implemented directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient (e.g., non-transitory) storage medium known in the art. An exemplary storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description is provided to enable a person skilled in the art to make or use the disclosed implementations. Various modifications to these implementations will be readily apparent to those skilled in the art, and the principles defined herein may be applied to other implementations without departing from the scope of the disclosure. Thus, the present disclosure is not intended to be limited to the implementations shown herein but is to be accorded the widest scope possible consistent with the principles and novel features as defined by the following claims.

What is claimed is:

1. A method comprising:
    generating first data at a first station of a wireless network in response to expiration of a particular time period that begins at a time of receipt of an incoming message at the first station, wherein the first data indicates a first set of stations within a particular range of the first station;
    transmitting a first message including the first data to a second station of the wireless network; and
    transmitting a second message including second data to the second station in response to expiration of a second particular time period that begins at a time of receipt of a second incoming message, wherein the particular time period and the second particular time period have different durations.

2. The method of claim 1, wherein the particular range is a one-hop range of the first station, wherein the first message includes an identifier, and wherein the incoming message includes the identifier.

3. The method of claim 1, wherein the first message comprises a multicast message, wherein the first set of stations is indicated by a first neighbor list, and wherein the first neighbor list comprises a multicast-specific neighbor list.

4. The method of claim 1, wherein the first message comprises a broadcast message.

5. The method of claim 1, further comprising:
    receiving a third message from the second station, the third message including third data that indicates a third neighbor list, wherein the first message and the third message include different identifiers, and wherein the first set of stations is indicated by a first neighbor list;
    comparing, at the first station, the first neighbor list to the third neighbor list; and
    determining whether at least one station identified by the third neighbor list is not identified by the first neighbor list.

6. The method of claim 5, further comprising determining not to transmit a copy of the third message in response to determining that each station identified by the third neighbor list is also identified by the first neighbor list.

7. The method of claim 5, further comprising:
    determining not to transmit a copy of the third message in response to determining that the first station has already transmitted another message with the same identifier as the third message during a first time period; and
    storing an identifier corresponding to each message transmitted by the first station during the first time period in a buffer of the first station.

8. The method of claim 5, further comprising determining a duration of a third particular time period at the first station in response to determining that at least one station identified by the first neighbor list is not identified by the third neighbor list.

9. The method of claim 8, further comprising transmitting a copy of the third message including the third neighbor list in response to expiration of the third particular time period.

10. The method of claim 8, further comprising:
    receiving a fourth message including fourth data indicating a fourth neighbor list from a third station of the wireless network prior to expiration of the third particular time period;
    determining that the third message and the fourth message have the same identifier;
    determining whether at least one station identified by the first neighbor list is not identified by the fourth neighbor list; and
    transmitting a copy of the third message including the first neighbor list in response to expiration of the third particular time period and conditioned on determining that at least one station identified by the first neighbor list is not identified by the fourth neighbor list.

11. The method of claim 8, further comprising:
    receiving a fourth message including fourth data indicating a fourth neighbor list from a third station of the wireless network prior to expiration of the third particular time period;
    determining that the third message and the fourth message have the same identifier;
    determining whether at least one station identified by the first neighbor list is not identified by the fourth neighbor list; and
    determining not to transmit a copy of the third message in response to determining that each station identified by the first neighbor list is also identified by the fourth neighbor list.

12. The method of claim 8, wherein the duration of the third particular time period is selected based on a random value or a pseudorandom value.

13. The method of claim 8, further comprising:
    determining a number of stations identified by the first neighbor list; and determining the duration of the third particular time period based on the number of stations.

14. The method of claim 8, further comprising:
determining a received signal strength indication (RSSI) for the third message; and
in response to the RSSI exceeding a threshold value, determining the duration of the third particular time period based on the RSSI.

15. The method of claim 8, further comprising:
determining a received channel power indication (RCPI) for the third message; and
in response to the RCPI exceeding a threshold value, determining the duration of the third particular time period based on the RCPI.

16. The method of claim 1, wherein the first message comprises a copy of the incoming message, wherein the incoming message includes data indicating a particular set of stations, and wherein the first set of stations includes at least one station that is not included in the particular set of stations.

17. The method of claim 1, further comprising generating a particular value at the first station, wherein a duration of the particular time period is based on the particular value.

18. The method of claim 1, further comprising determining a duration of the particular time period based on a random value or based on a pseudorandom value.

19. The method of claim 1, wherein the second data indicates at least the first set of stations.

20. The method of claim 1, wherein the second incoming message indicates a second identifier, and wherein the second message indicates the second identifier.

21. An apparatus comprising:
a processor; and
a memory coupled to the processor, wherein the memory stores instructions that are executable by the processor to perform operations comprising:
generating first data at a first station of a wireless network in response to expiration of a particular time period that begins at a time of receipt of an incoming message at the first station, wherein the first data indicates a first set of stations within a particular range of the first station;
transmitting a first message including the first data to a second station of the wireless network; and
transmitting a second message including second data to the second station in response to expiration of a second particular time period that begins at a time of receipt of a second incoming message, wherein the particular time period and the second particular time period have different durations.

22. The apparatus of claim 21, wherein the operations further comprise:
receiving a third message including third data indicating a third neighbor list from the second station, wherein the first set of stations is indicated by a first neighbor list;
comparing, at the first station, the first neighbor list to the third neighbor list; and
transmitting a copy of the third message including the first neighbor list in response to determining that at least one station identified by the first neighbor list is not identified by the third neighbor list and in response to expiration of a third particular time period.

23. The apparatus of claim 21, wherein the operations further comprise:
monitoring a number of messages received from the second station at the first station during a first time period; and
determining whether to transmit a network key to the second station based on the number of messages.

24. The apparatus of claim 23, wherein the operations further comprise determining to transmit the network key to the second station in response to the number of messages exceeding a threshold value.

25. The apparatus of claim 23, wherein the operations further comprise determining to transmit the network key to the second station in response to a score corresponding to the second station exceeding a threshold value, wherein the score is based at least in part on the number of messages.

26. The apparatus of claim 23, wherein the operations further comprise determining not to transmit the network key to the second station in response to the number of messages failing to exceed a threshold value.

27. An apparatus comprising:
means for generating first data at a first station of a wireless network in response to expiration of a particular time period that begins at a time of receipt of an incoming message at the first station, wherein the first data indicates a first set of stations within a particular range of the first station; and
means for transmitting a first message including the first data to a second station of the wireless network and for transmitting a second message including second data to the second station in response to expiration of a second particular time period that begins at a time of receipt of a second incoming message, wherein the particular time period and the second particular time period have different durations.

28. The apparatus of claim 27, further comprising:
means for receiving a third message including third data indicating a third neighbor list from the second station of the wireless network, wherein the first set of stations is indicated by a first neighbor list;
means for comparing, at the first station, the first neighbor list to the third neighbor list; and
means for transmitting a copy of the third message including the first neighbor list in response to determining that the first neighbor list identifies at least one station that is not identified by the third neighbor list and in response to expiration of a third particular time period.

29. A non-transitory computer readable medium comprising instructions that, when executed by a processor, cause the processor to:
generate first data at a first station of a wireless network in response to expiration of a particular time period that begins at a time of receipt of an incoming message at the first station, wherein the first data indicates a first set of stations within a particular range of the first station;
transmit a message including the first data to a second station of the wireless network; and
transmit a second message including second data to the second station in response to expiration of a second particular time period that begins at a time of receipt of a second incoming message, wherein the particular time period and the second particular time period have different durations.

30. The non-transitory computer readable medium of claim 29, wherein the instructions, when executed by the processor, further cause the processor to:
- determine whether the first station has transmitted at least one message during a third particular time interval prior to transmission of the message; and
- transmit the message including the first data in response to determining that the first station has not transmitted at least one message during the third particular time interval.

* * * * *